Sept. 29, 1925.  E. HOKANSON  1,555,576
LOCK NUT
Filed June 20, 1924
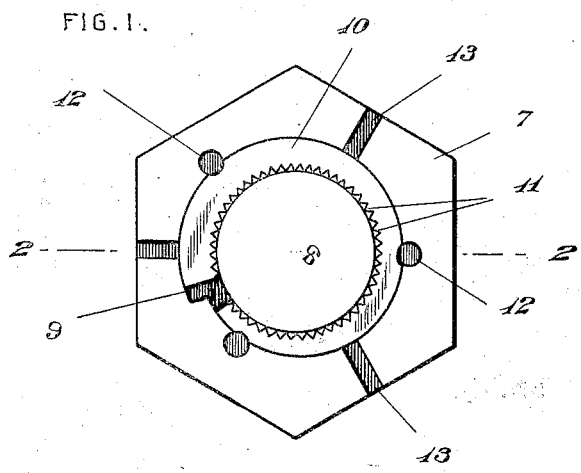
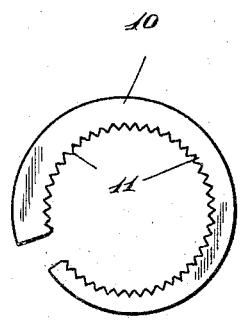
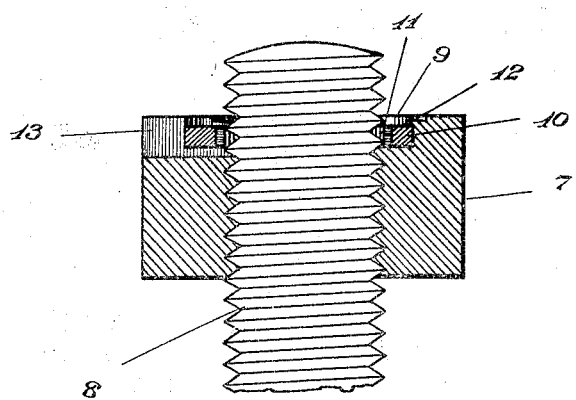
Inventor
EMANUEL HOKANSON,
By
Attorney.

Patented Sept. 29, 1925.

1,555,576

UNITED STATES PATENT OFFICE.

EMANUEL HOKANSON, OF GRAND FORKS, NORTH DAKOTA.

LOCK NUT.

Application filed June 20, 1924. Serial No. 721,238.

*To all whom it may concern:*

Be it known that I, EMANUEL HOKANSON, a citizen of United States, residing at Grand Forks, in the county of Grand Forks and State of North Dakota, have invented certain new and useful Improvements in Lock Nuts, of which the following is a specification, reference being had therein to the accompanying drawing.

The present invention relates to nut locks, and aims to provide simple and effective means for preventing a nut from unscrewing on a threaded bolt or shank on which it is mounted.

Another object of the invention is the provision of a nut having a novel clutch to grip the bolt or shank for preventing the reverse rotation of the nut.

It is also an object of the invention to provide a nut having a gripping clutch wherein the construction is simple, efficient, and capable of economical manufacture.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a face or plan view of the nut.

Fig. 2 is a section on the line 2—2 of Fig. 1 showing the bolt or shank in elevation.

Fig. 3 is a plan view of the clutch member.

The nut 7 with which the improvements are used may be of any size or shape, to screw on a threaded bolt or shank 8.

In carrying out the invention, the face of the nut 7 is provided with a circular recess or groove 9 adjacent to the hole of the nut in which is seated an arcuate clutch member 10. The recess or groove preferably extends through a complete circle while the clutch member extends through only part of but more than one-half of a circle (almost a complete circle) with the ends of the clutch member spaced apart slightly, so that the clutch member can embrace the bolt or shank 8. The clutch member is wider at one end than at the other and decreases in width in the direction in which the nut is rotated when screwed on the shank. The clutch member 10 is therefore in the form of a curved wedge, the groove 9 being similarly tapered, and the outer wall of the groove 9 is arranged spirally relatively to the axis of the nut and shank. The clutch member 10 is of spring steel or other resilient material, and its inner edge is serrated or formed with sharp teeth, as at 11, to bite the thread of the shank. The teeth or serrations 11 extend transversely across the inner edge or inner periphery of the clutch member throughout the length of said member so as to bite the thread of the shank effectively.

In order to retain the clutch member in the groove, portions 12 are punched down in the face of the nut at the outer edge of the groove 9, to slightly overlap the clutch member and thereby hold it in the groove. In this way, the clutch member 10 is the only element used aside from the nut itself, to provide a simple and economical construction.

The face of the nut is formed with radial slots 13 extending from the hole to the circumference of the nut and also passing under the groove 9, in order that a pry or other implement can be inserted in the slots for prying the clutch member 10 out of the groove 9, when it is desired to remove the clutch member from the nut for unscrewing the nut. The punched portions 12 and slots 13 are alternated as shown.

The nut can be readily screwed on the shank 8, being rotated clock-wise as seen in Fig. 1, and the clutch member 10 having a slight movement counter clock-wise of the nut, will release the clutch member sufficiently from the shank so as not to interfere with the rotation of the nut when screwing same on the shank. Should the nut be rotated reversely, either intentionally or accidentally, the teeth 11 having frictional contact with the shank 8 will retard the counter clock-wise (Fig. 1) movement of the clutch member, and the clutch member will therefore wedge between the shank and outer wall of the groove 9. This will contract the clutch member tightly on the shank, so that the clutch member grips the shank, and the greater is the torsion on the nut tending to unscrew same, the tighter will be the grip of the clutch member on the shank to prevent the unscrewing of the nut. The clutch member not only embraces the shank but is in the form of a wedge also, to effectively resist the reverse rotation of the nut.

The clutch member 10 being disposed in the recess or groove 9 will be within the normal surfaces of the nut, so that the nut has no objectionable projections or protuberances thereon.

Having thus described the invention, what is claimed as new is:—

1. A nut having a groove extending through more than one-half of a circle around the hole of the nut, and an arcuate clutch member disposed in said groove and extending through more than one-half of a circle so as to embrace the shank on which the nut is threaded, the inner edge of said clutch member having teeth to bite said shank, the outer edge of the clutch member and wall of the groove being of spiral form to contract the clutch member on the shank when the nut is rotated reversely, the nut having a slot extending behind said clutch member for the insertion of an implement to remove the clutch member from the groove.

2. A nut having a groove, and a clutch member in said groove to engage a shank on which the nut is threaded, the nut having a slot extending behind said clutch member for the insertion of an implement to remove the clutch member from the groove.

3. A nut having a curved groove at the hole thereof, and an arcuate clutch member in said groove to engage a shank on which the nut is threaded, the nut having portions for retaining said member in the groove and having radial slots extending behind said clutch member for receiving an implement to pry the clutch member out of the groove.

In testimony whereof I hereunto affix my signature.

EMANUEL HOKANSON.